Figure 1:
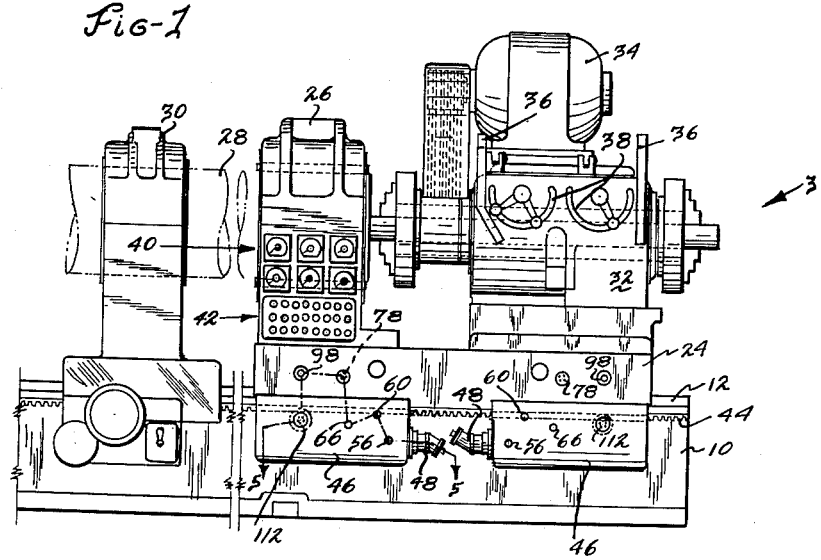

Dec. 4, 1962 W. A. KIMSEY 3,066,553
LATHE CARRIAGE DRIVE
Filed April 13, 1959 4 Sheets-Sheet 1

INVENTOR
WILLIAM A. KIMSEY
BY Toulmin & Toulmin
ATTORNEYS

INVENTOR
WILLIAM A. KIMSEY
BY Toulmin & Toulmin
ATTORNEYS

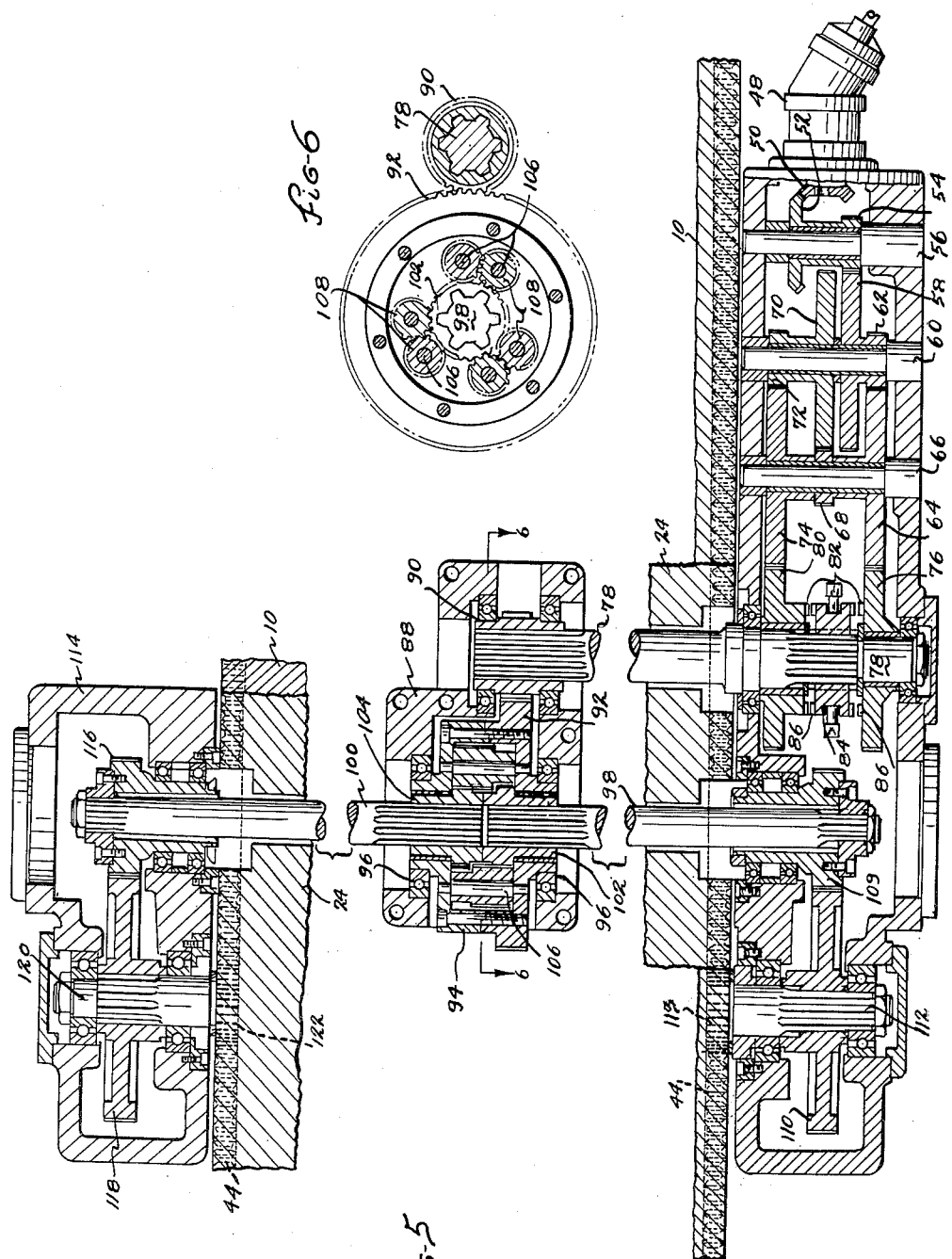

Dec. 4, 1962
W. A. KIMSEY
3,066,553
LATHE CARRIAGE DRIVE
Filed April 13, 1959
4 Sheets-Sheet 4
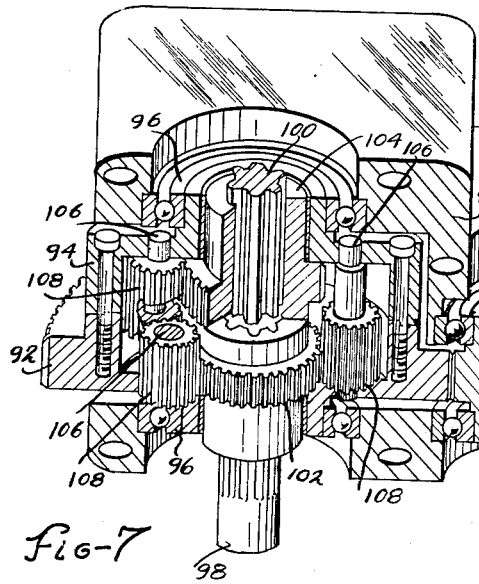
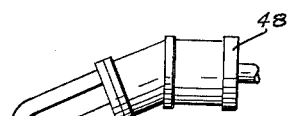
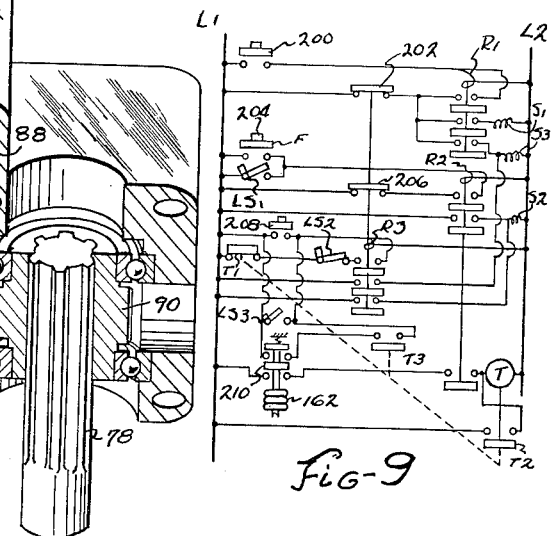
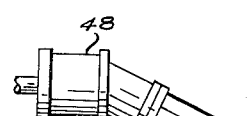
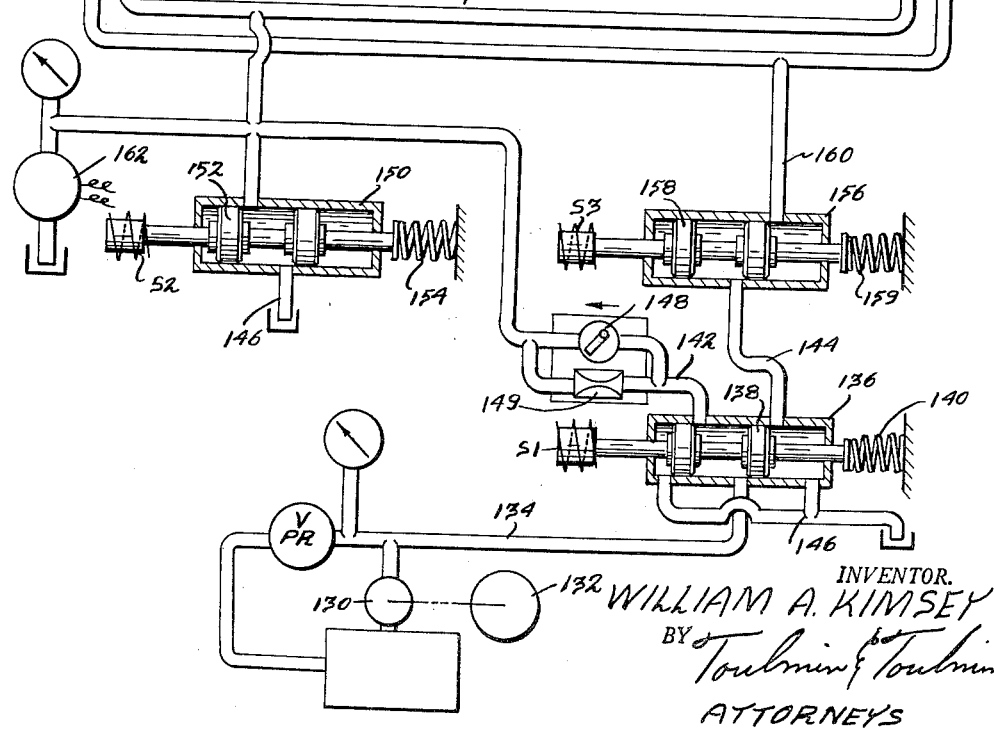
INVENTOR.
WILLIAM A. KIMSEY
BY Toulmin & Toulmin
ATTORNEYS

United States Patent Office 3,066,553
Patented Dec. 4, 1962

3,066,553
LATHE CARRIAGE DRIVE
William A. Kimsey, Cincinnati, Ohio, assignor to The R. K. Le Blond Machine Tool Company, Cincinnati, Ohio, a corporation of Delaware
Filed Apr. 13, 1959, Ser. No. 806,129
4 Claims. (Cl. 77—3)

This invention relates to a drive for carriages or lathes, and is particularly concerned with the drive arrangement for extremely large lathe carriages and like machine tool members that move along a machine bed.

In connection with known machine elements such as lathe carriages and also slides which are of conventional sizes, adequate control of the sliding movements can be had by a feed rod or lead screw as is done in most lathe structures. In some cases, however, the machine structure is of such a large size that a lead screw or the like is insufficient and undesirable for carrying the tremendous thrust loads that are to be imposed thereon in sliding the member along its ways and particularly where the member is at the same time loaded heavily by the cutting action of the tools carried thereby.

In still other cases the carriage or slidable member may become extremely wide between the ways on which it is supported and a carriage or slide of this nature is quite apt to tend to "crab" along the ways if driven at a single point such as would be the case in utilizing a lead screw or feed rod.

In other cases, the bed supporting the carriage or slidable element, and this is particularly the case with lathes, may become extremely long, up to 90 or 100 feet or more, and under these circumstances it becomes expensive and difficult to produce a lead screw of the proper length and accuracy to drive the carriage or slidable member the full length of its travel along such an elongated bed.

Further, a lead screw or feed rod elongated to this extreme length would have considerable flexibility in torsion and would also sag between its supports unless it were made extremely large and heavy.

Having the foregoing in mind, it is a primary object of the present invention to provide a drive for an extremely wide carriage or slide in a machine tool or the like which will eliminate crabbing or cocking of the slide or carriage on its supporting ways.

A still further object of this invention is the provision of a drive arrangement for the carriage or a slidable element of an extremely long machine tool which will eliminate the necessity of long feed rods or lead screws.

A still further object of this invention is the provision of a drive arrangement for a lathe carriage or the like which is carried substantially entirely on the carriage thereby greatly simplifying the construction and arrangement of the lathe bed.

It is also an object of this invention to provide a drive for a lathe carriage or the like in which the driving forces are distributed about the carriage permitting the development of extremely high driving forces beyond what could be established by use of a lead screw or the like.

Figure 2:
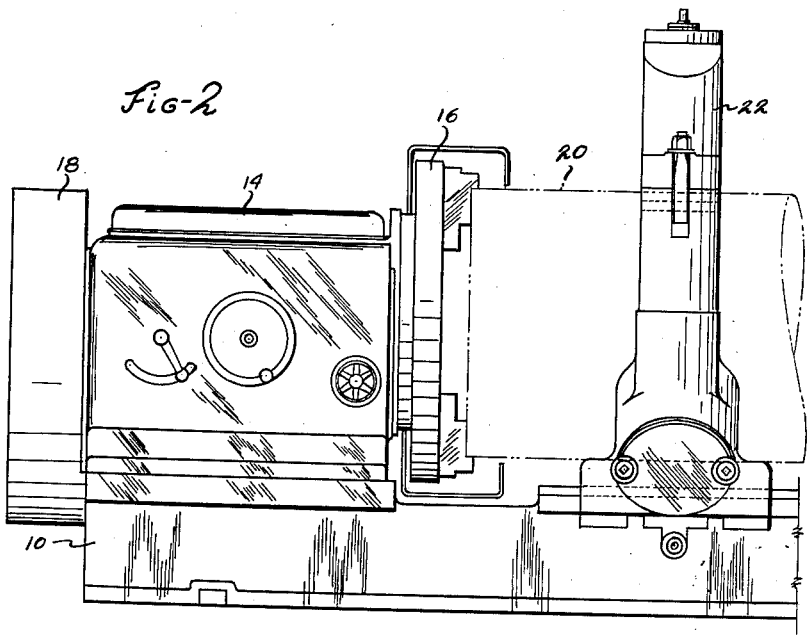
Figure 3:
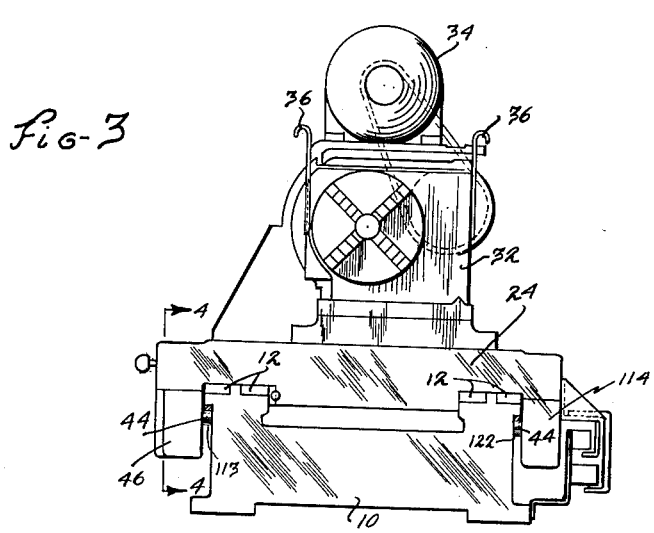
Figure 4:
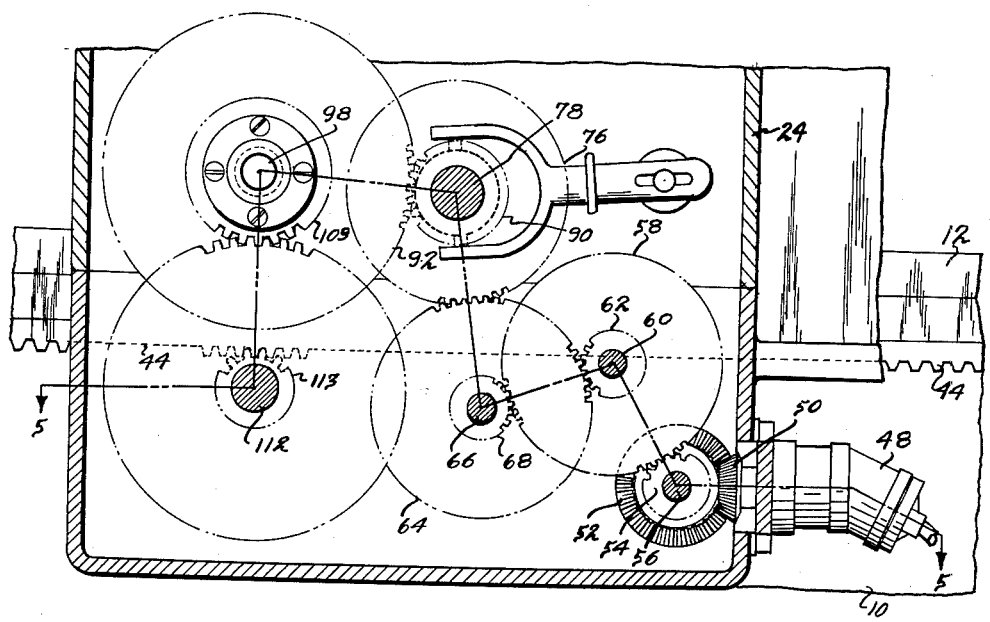

These and other objects and advantages will become more apparent upon reference to the accompanying drawings in which:

FIGURE 1 is an elevational view of one end of a long lathe structure showing a boring carriage provided with a drive arrangement according to this invention and also showing one bar support for supporting the boring bar at a point spaced along the bed from the boring carriage, FIGURE 2 is an elevational view similar to FIGURE 1 but shows the other end of the lathe which includes the rotary face plate that drives the work being operated and a steady rest structure that supports the work, FIGURE 3 is an elevational view looking in from the right end of the lathe as indicated by the arrow 3 on FIGURE 1, FIGURE 4 is a sectional view indicated by line 4—4 on FIGURE 3 showing a drive train between a hydraulic drive motor and a pinion driven thereby, FIGURE 5 is a sectional view indicated by line 5—5 on FIGURES 1 and 4 showing the drive train and including a transverse connection extending through the carriage which includes a planetary gear differential for dividing the power from the hydraulic motor between the two pinions at the opposite sides of the carriage, FIGURE 6 is a section through the planetary gear differential and is indicated by line 6—6 on FIGURE 5, FIGURE 7 is a perspective view partly broken away showing the planetary gear differential, FIGURE 8 is a diagrammatic representation of a hydraulic circuit for actuating the hydraulic drive motors of the boring carriage, and FIGURE 9 is a diagrammatic representation of an electric control circuit that could be employed for controlling the operation of the machine.

Referring to the drawings more in detail, the machine in connection with which the present invention is illustrated is a lathe comprising a bed 10, the right end of which is seen in FIGURE 1 and the left end of which is seen in FIGURE 2. This bed may be extremely long up to, say, 130 feet or more, and may advantageously be made up of sections on the order of about 30 feet in length. The bed sections are bolted together to form the completed bed. As will be seen in FIGURE 3, the bed is provided with way portions 12 for slidably receiving steady rests, support bars, and a boring carriage means. These ways are hardened and ground and extend the full length of the bed.

Mounted on the bed at the left end thereof is a headstock arrangement 14 that includes a face plate 16 adapted for being driven in rotation by a drive motor (not shown) via belt or chain drive means extending into the cover 18. Face plate 16 is adapted for gripping the end of a workpiece 20 that extends through a plurality of spaced steady rest means 22 that are movably mounted on the bed 10. These steady rests, which may be of a conventional nature, support the workpiece 20 for rotation about its central axis. There may be provided one or more of the steady rests, depending upon the length of the workpiece being operated.

At the other end of the bed 10 and slidably supported on ways 12 is a boring carriage 24 that includes an upstanding part 26 adapted for fixedly supporting the end of a tool 28. Tool 28 extends leftwardly through the bar supports 30 which are movably mounted on the lathe bed and of which supports there may be a plurality spaced along the bed, depending upon the length of the tool being employed. These supports preferably include motors so that they can be traversed along the bed and in addition are arranged so that as the boring carriage advances toward the head end of the bed, the bar supports will be moved along thereby, and thereafter when the boring carriage retracts the bar supports will be retracted thereby until they reach the positions at which they are supposed to be located at the beginning of the boring operation.

In addition, and not shown in the drawings, in about the middle of the bed there is a bar support that sealingly engages the end of the work and also sealingly engages the boring bar and through which support the coolant for the boring operation being carried out is supplied.

The boring carriage 24 may have detachably mounted thereon a driving head 32 for driving small boring bars. This unit has its own driving motor 34, and, as mentioned, can readily be detached from the boring carriage by utilizing the lift hooks 36. This unit likewise has its own controls as indicated at 38 and is thus operable independently of the remainder of the machine.

The support 26 that receives the end of the larger boring bar may be availed of for supporting gauges 40 to indicate the operating conditions of the machine such as the speed and horse power of the spindle and the feed speed of the boring bar and the like. There may also be carried on member 26 control push buttons generally indicated at 42. This makes up a centralized control panel from which the spindle and bar, rate of feed and traverse, and the coolant pumps for the machine can be controlled.

In the machine illustrated, the lathe carriage is on the order of 6 feet from side to side, and because of this extreme width the carriage has a tendency to crab along the bed when it is advanced by any usual type of drive means. According to the present invention this tendency of the carriage to crab along the bed is entirely eliminated by mounting along each side of the bed a rack 44 extending along the bed for the full distance of travel of the boring carriage, and which racks are engaged by pinions distributed about the boring carriage with the pinions being interconnected and driven so as to advance the carriage along the lathe bed without twisting or crabbing. This is accomplished by arranging the pinions adjacent the corners of the carriage and interconnecting the pinions in pairs through differential units to hydraulic drive motors.

Reference to FIGURES 1, 4, and 5 will show that the boring carriage 24 has a pair of dependent housings 46 carried thereon, each of which housings carries a hydraulic motor 48. Each hydraulic motor 48 has mounted on its output shaft a bevel gear 50 meshing with another bevel gear 52 to which is fixed a pinion 54. The bevel gear 52 and pinion 54 are rotatable on a shaft 56. Pinion 54 meshes with a gear 58 rotatable on shaft 60 and fixed to a pinion 62 that meshes with a gear 64 rotatable on a shaft 66. Gear 64 has integral therewith a pinion 68 meshing with a gear 70 rotatable on shaft 60 and the same size as gear 58. Gear 70 has fixed thereto a pinion 72 meshing with a gear 74 rotatable on shaft 66 and the same size as gear 64. The described arrangement provides for counter rotation of gears 64 and 74 at the same speed when hydraulic motor 48 pertaining thereto is energized.

Gear 64 meshes with another gear 76 rotatable on a shaft 78 and gear 74 meshes with a gear 80 the same size as gear 76 and also rotatable on shaft 78. Gears 76 and 80 have elements 82 of a jaw clutch on their inner sides and slidably splined to shaft 78 between these elements is a clutch member 84 having the other elements 86 of the said jaw clutch on its opposite sides. It will be evident that actuation of clutch member 84 can be utilized for selectively coupling either of gears 76 or 80 with shaft 78, or for uncoupling the shaft from both of the said gears.

Shaft 78, and which shaft it will be noted in FIGURES 1 and 4 is located in the boring carriage above the upper level of bed 10, extends into the region of the center of the boring carriage and into a housing 88 attached to the under side of the carirage. Within the housing and connected to the end of shaft 78 as by a spline is a pinion 90 that meshes with a gear 92 in the housing which forms a part of a two part hollow planet carrier 94 journaled within the housing on the antifriction bearings 96.

The planet carrier referred to forms a part of a differential unit which is illustrated in FIGURES 6 and 7 in addition to FIGURE 5. Extending into housing 88 from opposite sides thereof and on the axis of rotation of planet carrier 94 are the shafts 98 and 100. Splined to the end of shaft 98 within the planet carrier is a gear 102, and splined to the end of shaft 100 within the planet carrier is a gear 104 of the same size as gear 102. Within the planet carrier and arranged in distributed relation about the peripheries of gears 102 and 104 are a plurality of pinion support shafts 106. These support shafts carry the pinions 108 which mesh with each other thus forming intermeshing pairs of pinions. Each pair of the pinions, however, consists of a first pinion meshing with only one of gears 102 and 104 and a second pinion meshing with the other of the gears. There are preferably three such pairs of intermeshing pinions within the planet carrier.

Shaft 98, which is splined to gear 102, extends into the housing 46 and is attached therein to gear 109 that meshes with gear 110 fixed to shaft 112. Shaft 112 extends out the inner wall of housing 46 and has attached thereto a pinion 113 running on rack 44.

Similarly, shaft 100, which is attached to gear 104, extends to the other side of the carriage into a smaller housing 114 carried by the carriage and therein is attached to a gear 116 meshing with gear 118 attached to shaft 120 corresponding with shaft 112 and having attached to its inner end a pinion 122 meshing with the adjacent rack 44.

The arrangement is such that energization of hydraulic motor 48 will drive through the gear train and the described differential and cause the two pinions 113 and 122 to rotate and provide equal thrusts at the front corners of the carriage, thus causing the carriage to advance smoothly along the lathe bed without any tendency for the carriage to knock or crab during its movements. The differential provides for an equal division of power between the pinions except upon any tendency of the carriage to crab, in which case the retarded corner receives greater power than the other thus offsetting the said crabbing tendency.

For some carriages the provision of two driving pinions is sufficient but in the present case where the carriage is of substantial length as well as width and embodies considerable weight and requires a high thrust during working operations, there is preferably provided pinions at the rear corners of the carriage which are driven through an identical gearing arrangement from the other of the hydraulic motors 48.

In addition to eliminating any tendency for the carriage to crab, the described arrangement also eliminates long expensive lead screws and feed rods, and there is only required the hydraulic lines 124 leading to the hydraulic motors with suitable valve means being associated therewith to control the supply of fluid to the motors.

The hydraulic circuit by means of which the motors 48 are operated is illustrated in FIGURE 8. In this figure pump 130 is driven by a motor 132 so as to discharge fluid under pressure into a conduit 134. This conduit leads to the inlet of a four-way reversing valve 136 having a valve member 138 normally urged by spring 140 into position to connect the pressure conduit with conduit 142 while conduit 144 is connected with an exhaust manifold 146. Energization of a solenoid S-1 is operable to shift the valve member to reverse the aforementioned connections.

Conduit 142 leads through the parallel connected valve 148 and choke valve 149 to one side of each of motors 48 and also to one port of a two-way valve 150. Valve 150 has a valve member 152 normally urged by spring 154 to connect conduit 142 with exhaust manifold 146, and there is provided a solenoid S-2 energizable for shifting the valve member into position to block off conduit 142. Thus when no power is developed by the motors 48 there is no pressure in line 142 therefor, no heat is added to the oil during idle periods.

Conduit 144 leads to a port of a two-way valve 156 having valve member 158 normally urged by a spring 159 into position to interrupt communication between conduit 144 and conduit 160, and there is provided a solenoid S-3 energizable for shifting valve member 158 into position to interconnect conduits 144 and 160, conduit 160 leading to the side of motors 48 opposite the connection thereto of conduit 142.

There is connected with conduit 142 a pressure switch 162 to detect pressure of a predetermined amount within the said conduit.

To obtain traverse of the carriage, solenoids S–1 and S–3 are energized. Solenoid S–2 remains de-energized, with the solenoids so energized fluid passes from conduit 134 to conduit 144 and thence to conduit 160 and then through motors 48 to conduit 142, then through valve 150 to exhaust. This provides for rapid traversing movements of the boring carriage in the feed direction. To obtain reduced speed for feeding movements, solenoid S–2 is energized, and this disconnects conduit 142 from the exhaust, and the fluid therefrom must instead pass through choke valve 149. This provides for feed movement of the boring carriage. The boring carriage can be halted at any time by de-energization of solenoids S–1, S–2 and S–3 which will interrupt the supply of fluid to conduit 160 and block any discharge from conduit 160. This also unblocks lines 134 and 142 and allows free flow of fluid from pump to tank.

Reverse movement of the boring carriage is had by energizing solenoids S–2 and S–3 leaving solenoid S–1 de-energized which provides for flow of fluid from conduit 134 to conduit 142 and thence through check valve 148 to one side of the hydraulic motors 48, with the other side therefore being connected through conduits 160 and 144 with the exhaust manifold 146. As before, movement of the boring carriage may be halted by de-energization of solenoids S–1, S–2 and S–3.

The change from traverse or feed movement to reverse may be accomplished by a limit switch control, or by pressure switch 162, or pressure switch 162 may be employed to cause automatic retraction of the boring carriage in event resistance beyond a pre-determined amount is encountered, which could indicate dulling of the cutting tool.

The arrangement of the present invention provides a convenient and economical manner in which large, heavy, wide carriages or slide members can be actuated along a machine bed so that the movement thereof is under perfect control at all times and without there being any tendency for the carriage to twist on the ways which could cause sticking and crabbing leading to excessive wear of the sliding machine parts and the carrying out improperly of work operations.

The construction of the bed is simplified since it is not necessary to provide supports therein or driving arrangements therein for lead screws or feed rolls. The entire carriage actuating mechanism including the drive motors and controls therefor are associated with the carriage, and the only thing that is provided on the bed are the elongated rack elements.

As to the differential units which are employed, it will be evident that the gears 102 and 104 thereof form output members that are connected by the shafts 98 and 100 with the gearing leading to the pinions that engage the racks on the bed. Each gear 92 of the differential units then comprises an input member which, when driven, serves to supply equal power to the output members 102 and 104 of the differential units.

FIGURE 9 diagrammatically illustrates one form of circuit in which the solenoids S1, S2 and S3 could be connected for effecting automatic control of the machine, including automatic retraction of the carriage upon the encountering of a predetermined load thereby.

In FIGURE 9 there is a push button 200 which can be closed to energize relay R1 having a holding circuit extending through a normally closed blade 202 of a relay R3. Relay R1 has blades that close when the relay is energized to bring about energization of solenoids S1 and S3 which will put the carriage on rapid traverse.

Another push button 204 is connected in circuit with a relay R2 so that closing of the push button will energize relay R2 and which has a holding circuit through another normally closed blade 206 of relay R3. A limit switch LS1 is connected in by-passing relation to switch 204 so that it can be tripped by the carriage at a predetermined point in its travel to automatically initiate said movement of the carriage. Relay R2 has a blade in circuit with solenoid S2 so that when the relay is energized solenoid S2 will become energized along with solenoids S1 and S3 and the carriage will advance at feed rate.

A third push button 208 is provided which is in circuit with relay R3 and which relay has a holding circuit through a limit switch LS2 and is normally closed by timer blade T1. Closing of push button 208 will energize relay R3 which, through its blades 202 and 206 will de-energize relays R1 and R2.

Blades of relay R3 in circuit with solenoids S2 and S3 cause energization thereof while solenoid S1 is de-energized and this will cause retracting movement of the carriage. Switch LS2 is adapted for being opened when the carriage reaches its retracted position thus halting the retracting movement.

Push button 208 is by-passed by a limit switch LS3 which may be positioned to be closed by the carriage at a predetermined advanced position and thus initiating the retraction of the carriage.

The previously mentioned pressure switch 162 has a normally open blade by-passing push button 208 and also has a normally open blade in circuit with timer T which controls blade T1 and which has its own holding blade T2.

When the pressure supplied to switch 162 is reduced to a predetermined value indicating that the carriage is encountering a predetermined resistance, the blades of pressure switch 162 will close thereby energizing relay R3 and initiating retracting movement of the carriage. Simultaneously timer T will be energized and after a brief interval will open blade T1 thereof momentarily thereby to halt the retracting movement of the carriage and also blade T2 will open to de-energize the timer.

Retracting movement can be resumed by closing push button 208 to prevent the timer T from again becoming energized, and is in circuit with a normally open blade 210 of relay R2.

Further, in order to insure that the pressure switch will not again become operative after the momentary retraction, it is in circuit with a third timer blade T3 which closes only while timer T is energized whereupon at the termination of the momentary retracting movement, the pressure switch becomes ineffective for again energizing relay R3.

It will be understood that this invention is susceptible to modification in order to adapt it to different usages and conditions, and accordingly, it is desired to comprehend such modifications within this invention as may fall within the scope of the appended claims.

I claim:

1. In a machine tool; a bed having spaced ways, a generally rectangular slide on the ways having side edges adjacent the opposite sides of said bed and also having front and back ends, racks on the bed parallel with the ways and adjacent the side edges of the slide, pinions on the slide at each end thereof and at both side edges thereof meshing with the racks, a pair of differential units on the slide each located intermediate the side edges of the slide and each having a pair of output members extending in opposite directions therefrom and connected with the pinions at one end of the slide and each said unit also having an input member extending therefrom toward one side edge of the slide, hydraulic motors mounted on the slide and connected with said input members, a source of fluid under pressure, a reversing valve connecting the source of fluid with said motors, said motors being connected in parallel, a choke valve and check valve in parallel between the reversing valve and one side of said motors, a two-way valve connected between the reversing valve and the other side of said motors, and another two-way valve connected between the said one side of said motors and exhaust.

2. In a machine tool; a bed having spaced ways, a generally rectangular slide on the ways having side edges adjacent the opposite sides of said bed and also having front and back ends, racks on the bed parallel with the ways and adjacent the side edges of the slide, pinions on the slide at each end thereof and at both side edges thereof meshing with the racks, a pair of differential units on the slide each located intermediate the side edges of the slide and each having a pair of output members extending in opposite directions therefrom and connected with the pinions at one end of the slide and each said unit also having an input member extending therefrom toward one side edge of the slide, hydraulic motors mounted on the slide and connected with said input members, a source of fluid under pressure, a reversing valve connecting the source of fluid with said motors, said motors being connected in parallel, a choke valve and check valve in parallel between the reversing valve and one side of said motors, a two-way valve connected between the reversing valve and the other side of siad motors, and another two-way valve connected between the said one side of said motors and exhaust, each of said valves being independently operable whereby the motors can be driven rapidly in either direction, or at reduced speed in one direction, or can be locked against rotation.

3. An arrangement according to claim 2 in which there is a geared transmission connecting each said hydraulic motor with its pertaining input member, and each said geared transmission including reversing gears whereby the said reduced speed of operation can be obtained in either direction of movement of said slide on the ways, each said geared transmission being carried by the slide at the side edge thereof.

4. In a machine tool; a bed having spaced slide supporting ways, a generally rectangular slide slideably mounted on the said ways and having side edges adjacent the sides of said bed and also having front and back ends, racks on the bed parallel with the said ways and adjacent the side edges of the slide, pinions on the slide at each end thereof and at both sides thereof meshing with said racks, a pair of differential units mounted on the slide, each said unit having a pair of output members connected with the respective pinions at one end of the slide, each said unit also having an input member, a hydraulic motor on the slide for each differential unit and connected with the input member of the respective unit, said hydraulic motors being connected in parallel, a source of fluid under pressure, a reversing valve connecting the source of fluid with said motors, a choke valve connected between the reversing valve and one side of said motors, a check valve connected in parallel with said choke valve and opening toward said motors, a two-way valve connected between the reversing valve and the other side of said motors, and another two-way valve connected between the said one side of said motors and exhaust.

References Cited in the file of this patent

UNITED STATES PATENTS

| | | |
|---|---|---|
| 895,661 | Morrison | Aug. 11, 1908 |
| 1,298,060 | Krieg | Mar. 25, 1919 |
| 1,810,747 | Benzon | June 16, 1931 |
| 2,181,055 | Hirvonen | Nov. 21, 1939 |
| 2,360,118 | Gallimore et al. | Oct. 10, 1944 |
| 2,679,678 | Stephan | Jan 1, 1954 |
| 2,690,205 | Stary | Sept 28, 1954 |
| 2,788,679 | Mott | Apr. 16, 1957 |
| 2,900,846 | Lehman | Aug. 25, 1959 |
| 2,952,065 | Riedel | Sept. 13, 1960 |
| 2,969,698 | Carlstedt | Jan. 31, 1961 |